(12) United States Patent
Maguire et al.

(10) Patent No.: US 9,537,190 B2
(45) Date of Patent: Jan. 3, 2017

(54) BATTERY CELL SEPARATORS

(71) Applicant: FORD GLOBAL TECHNOLOGIES, LLC, Dearborn, MI (US)

(72) Inventors: Patrick Daniel Maguire, Ann Arbor, MI (US); Saravanan Paramasivam, South Lyon, MI (US); James George Gebbie, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 14/249,419

(22) Filed: Apr. 10, 2014

(65) Prior Publication Data

US 2014/0220410 A1    Aug. 7, 2014

Related U.S. Application Data

(63) Continuation-in-part of application No. 13/326,460, filed on Dec. 15, 2011, now Pat. No. 8,709,644.

(60) Provisional application No. 61/430,203, filed on Jan. 6, 2011.

(51) Int. Cl.
| | |
|---|---|
| *H01M 2/14* | (2006.01) |
| *H01M 10/6566* | (2014.01) |
| *H01M 10/625* | (2014.01) |
| *H01M 10/653* | (2014.01) |
| *H01M 10/647* | (2014.01) |
| *H01M 10/6557* | (2014.01) |

(52) U.S. Cl.
CPC ....... *H01M 10/6566* (2015.04); *H01M 10/625* (2015.04); *H01M 10/647* (2015.04); *H01M 10/653* (2015.04); *H01M 10/6557* (2015.04); *H01M 2220/20* (2013.01)

(58) Field of Classification Search
CPC  H01M 2/206; H01M 2/1077; H01M 10/5004; H01M 10/5073; H01M 10/625; H01M 10/647; H01M 10/653; H01M 10/6557; H01M 10/6566; H01M 2220/20; Y02E 60/12
See application file for complete search history.

(56) References Cited

U.S. PATENT DOCUMENTS

| | | |
|---|---|---|
| 2,514,056 A | 7/1950 | Hatfield |
| 3,714,513 A | 1/1973 | Marconi |
| 3,723,823 A | 3/1973 | Lit et al. |
| 4,324,330 A | 4/1982 | Durney |
| 4,444,853 A | 4/1984 | Halsall et al. |
| 4,538,211 A | 8/1985 | Bertellotti et al. |
| 4,544,066 A | 10/1985 | Koppensteiner et al. |
| 4,613,550 A | 9/1986 | Jergl et al. |

(Continued)

FOREIGN PATENT DOCUMENTS

| | | |
|---|---|---|
| WO | 2009128220 A1 | 10/2009 |
| WO | 2010019503 A2 | 2/2010 |

(Continued)

*Primary Examiner* — Patrick Ryan
*Assistant Examiner* — Ben Lewis
(74) *Attorney, Agent, or Firm* — David B. Kelley; Brooks Kushman P.C.

(57) ABSTRACT

A battery cell separator includes a body having front and rear sides for being stacked against respective battery cells. The body has a cross-section between the front and rear sides. The cross-section may have a saw-wave pattern, a square-wave pattern, or a sine-wave pattern.

8 Claims, 10 Drawing Sheets

(56) References Cited

U.S. PATENT DOCUMENTS

| | | |
|---|---|---|
| 6,344,728 B1 | 2/2002 | Kouzu et al. |
| 6,434,018 B1 | 8/2002 | Waltz |
| 6,475,659 B1 | 11/2002 | Heimer |
| 6,760,220 B2 | 7/2004 | Canter et al. |
| 7,128,999 B1 | 10/2006 | Martin et al. |
| 7,507,500 B2 | 3/2009 | Donnelly et al. |
| 7,531,270 B2 | 5/2009 | Buck et al. |
| 2006/0202661 A1 | 9/2006 | Kim et al. |
| 2007/0026303 A1 | 2/2007 | Jeon et al. |
| 2007/0037051 A1 | 2/2007 | Kim et al. |
| 2007/0178377 A1* | 8/2007 | Kim .............. H01M 2/021 429/152 |
| 2007/0264563 A1 | 11/2007 | Yoon et al. |
| 2007/0285051 A1 | 12/2007 | Jeon et al. |
| 2008/0118819 A1 | 5/2008 | Gamboa et al. |
| 2008/0124622 A1 | 5/2008 | Hamada et al. |
| 2008/0160395 A1* | 7/2008 | Okada .............. B60L 3/0046 429/99 |
| 2008/0280194 A1 | 11/2008 | Okada |
| 2009/0017366 A1 | 1/2009 | Wood et al. |
| 2009/0111010 A1 | 4/2009 | Okada et al. |
| 2009/0142650 A1 | 6/2009 | Okada et al. |
| 2009/0269657 A1 | 10/2009 | Mita et al. |
| 2010/0289295 A1 | 11/2010 | Yoda et al. |
| 2011/0274951 A1 | 11/2011 | Yasui et al. |
| 2012/0175320 A1 | 7/2012 | Paramasivam et al. |
| 2012/0177952 A1 | 7/2012 | Maguire et al. |
| 2012/0244404 A1 | 9/2012 | Obasih et al. |
| 2013/0143083 A1 | 6/2013 | Utley et al. |

FOREIGN PATENT DOCUMENTS

| | | |
|---|---|---|
| WO | 2010019764 A2 | 2/2010 |
| WO | 2010030605 A2 | 3/2010 |

\* cited by examiner

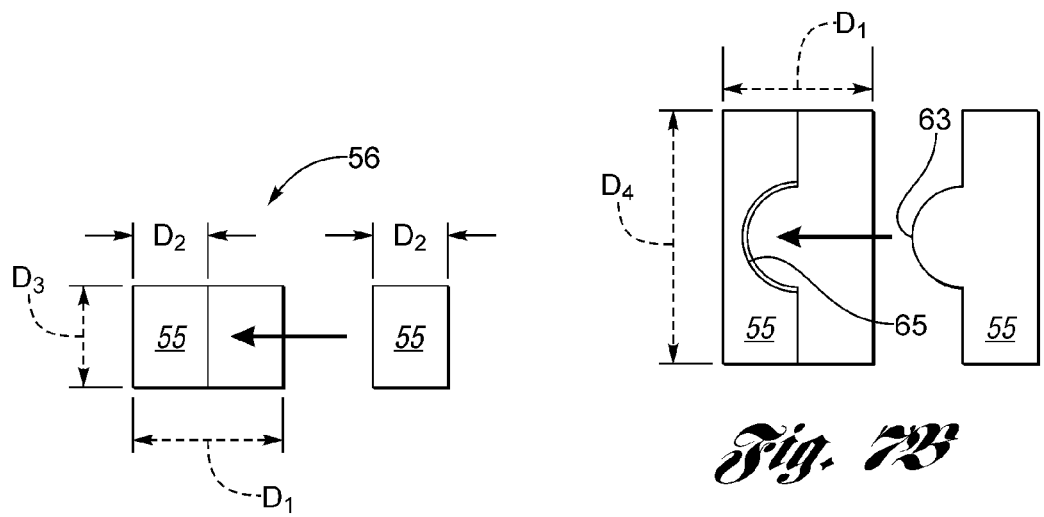
Fig. 7A
Fig. 7B
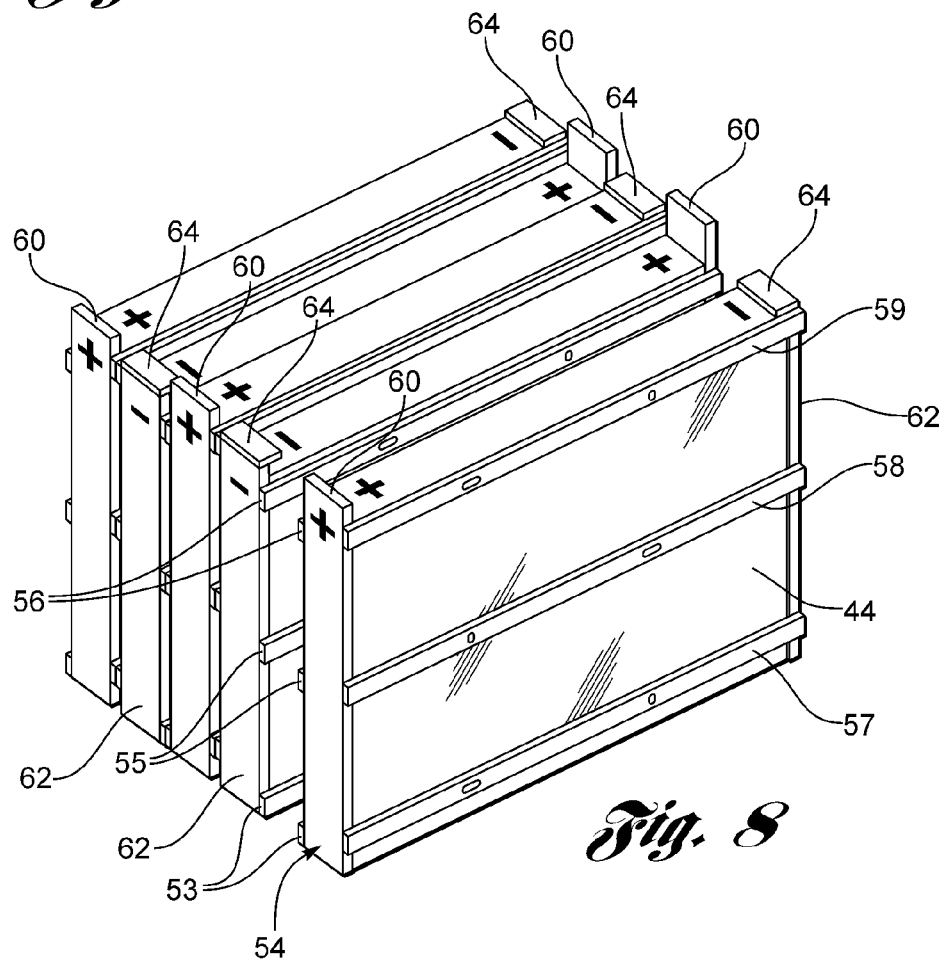
Fig. 8

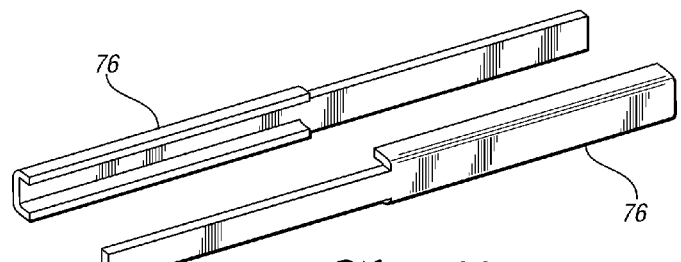
Fig. 11
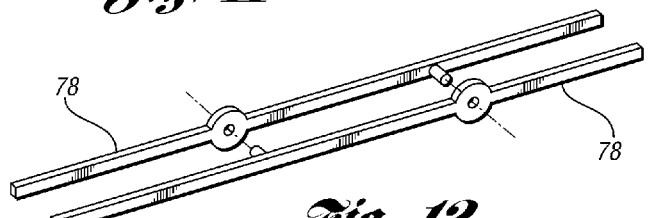
Fig. 12
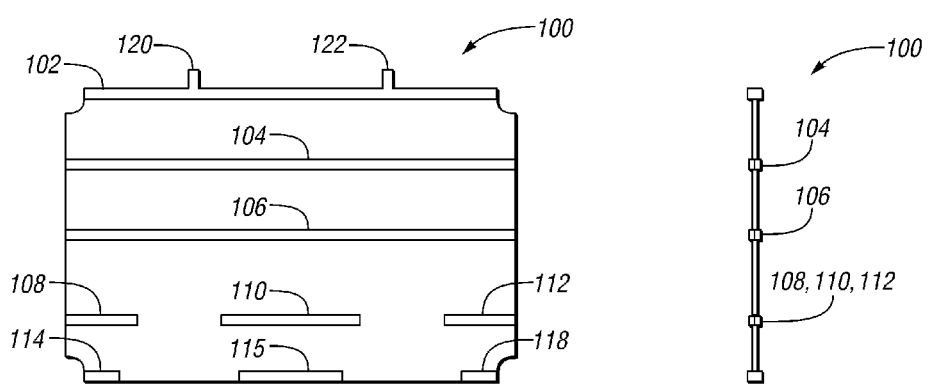
Fig. 14A.
Fig. 14C.
Fig. 14B.

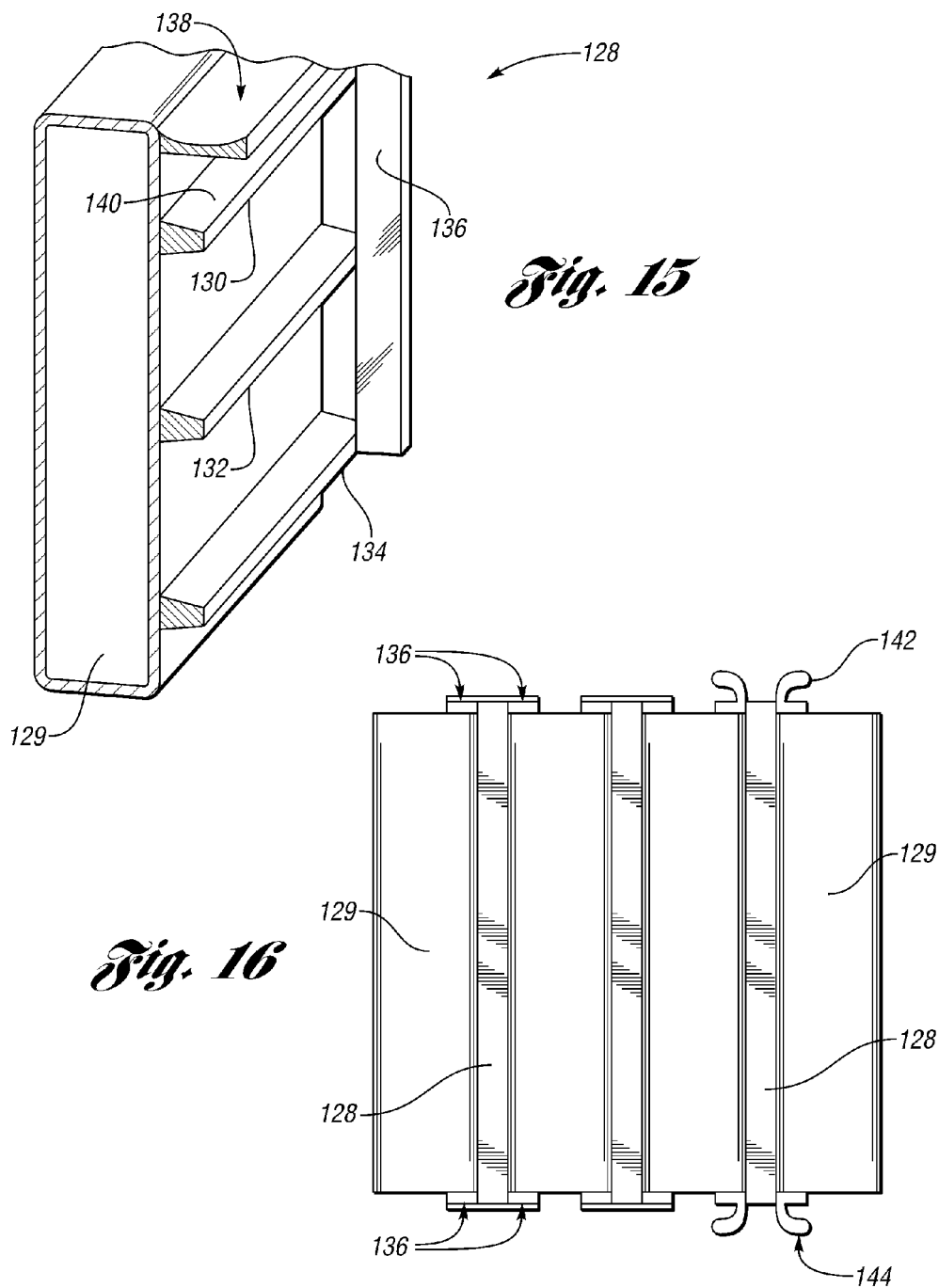

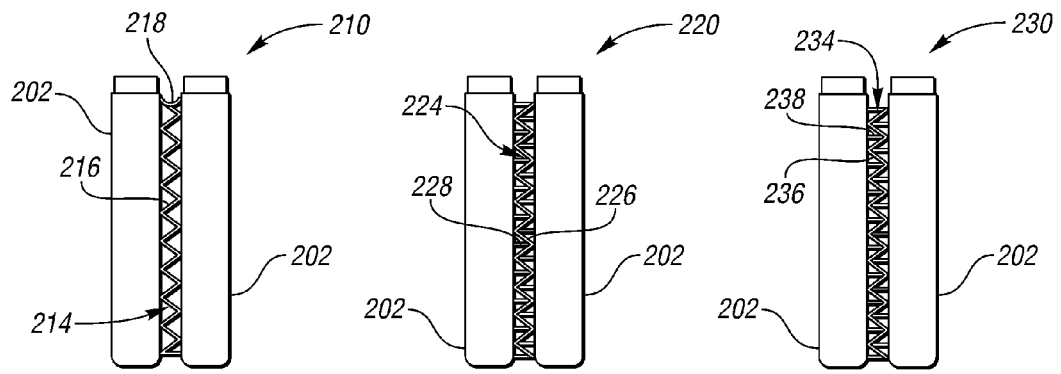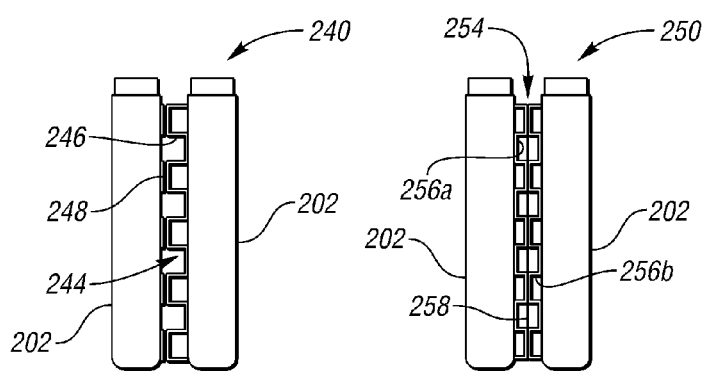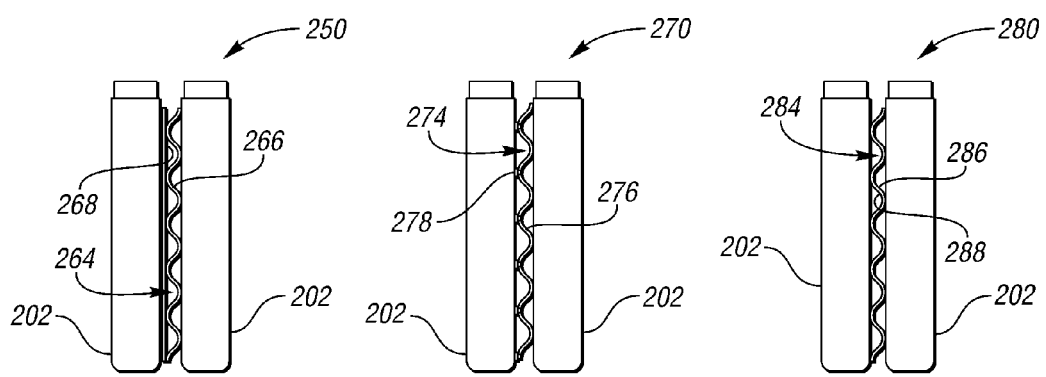

BATTERY CELL SEPARATORS

CROSS-REFERENCE TO RELATED APPLICATIONS

This application is a continuation-in-part of U.S. application Ser. No. 13/326,460, filed Dec. 15, 2011; which claims the benefit of U.S. Provisional Application No. 61/430,203, filed Jan. 6, 2011; the disclosures of which are incorporated in their entirety by reference herein.

TECHNICAL FIELD

The present invention relates to separators or spacers for battery cells of a battery module.

BACKGROUND

A battery module may include battery units (i.e., battery cells) and separators (i.e., spacers) which are arranged together to form the module. The cells may each have a prismatic shape such that the module is configured as a prismatic structure. The cells may be electrically connected in series to one another to increase output power and form a high voltage (HV) battery module. Such battery modules may be used in electric and hybrid electric vehicles. The separators are disposed between adjacent cells and physically separate neighboring cells from one another.

Simple prismatic battery cell designs may not include features to retain, support, separate, and/or isolate the battery cells. In such cases, the cells may have to be redesigned to provide the missing features or interfacing components may have to perform these functions.

SUMMARY

Embodiments of the present invention generally provide battery cell separators for the battery cells of a battery module in which the separators may be used to hold and support the cells, separate the cells to facilitate cooling, and/or isolate the cells from adjacent cells or other conductive surfaces.

Embodiments of the present invention provide battery cell separators for a battery module having battery cells in which the separators pertain to a stackable alternating separator-cell design and are configured to separate neighboring battery cells from one another and provide fluid flow paths therebetween to facilitate cooling. Embodiments of the present invention provide battery cell separators for a battery module having battery cells in which the separators pertain to a cartridge style separator design and are configured to be stacked side-by-side with other cartridge and cell sub-assemblies. Embodiments of the present invention provide battery cell separators for a battery module having battery cells in which the separators are configured as cartridge-like retainers for the cells. In these latter embodiments, each retainer may have one or more features that separate it from an adjacent cartridge such that fluid flow paths are between the cells.

In accordance with an embodiment of the present invention, a battery module is provided. The module includes a battery cell separator including a body having front and rear sides for being stacked against respective battery cells. The body has a cross-section between the front and rear sides with one of a saw-wave pattern, a square-wave pattern, and a sine-wave pattern.

In an embodiment, the separator may be a single piece of an electrical insulator or a single piece of plastic.

In an embodiment, the body may include a dish section to trap moisture.

In an embodiment, the separator may further include columns extending between the front and rear sides of the body. In this case, the body may be a single piece of an electrical insulator and the columns are thermal conductors.

Further, in accordance with an embodiment of the present invention, another battery module is provided. This module includes a battery cell separator including a thermally conductive body and an electrical insulator. The body has a front side for being stacked against a battery cell and a rear side. The insulator is positioned against the rear side of the body for being stacked between another battery cell and the rear side of the body.

In an embodiment, the body has a cross-section between the front and rear sides with a crenelated pattern. In this case, the electrical insulator may include a plurality of electrical insulators which are positioned against respective portions of the rear side of the body for being stacked between the other battery cell and the rear side of the body. Alternatively, the electrical insulator may be a single insulator layer.

In an embodiment, the body has a cross-section between the front and rear sides with a sine-wave pattern. In this case, the electrical insulator may include a plurality of electrical insulators which are positioned against respective portions of the rear side of the body for being stacked between the other battery cell and the rear side of the body. Alternatively, the electrical insulator may be a single insulator layer. The insulator layer may have a cross-section with the sine-wave pattern.

Also, in accordance with an embodiment of the present invention, another battery module is provided. This module includes a battery cell separator including first and second thermally conductive bodies and an electrical insulator. Each body has a front side for being stacked against a respective battery cell, each body further having a rear side. Each body has a cross-section between the front and rear sides of the body with a crenelated pattern. The insulator is between the rear sides of the bodies.

BRIEF DESCRIPTION OF THE DRAWINGS

FIG. 7A illustrates a cross-sectional view of mated ribs of battery cell separators placed side-by-side in accordance with the third embodiment of the present invention;

FIG. 7B illustrates a cross-sectional view of mated ribs of battery cell separators placed side-by-side in accordance with the third embodiment of the present invention;

FIG. 8 illustrates a perspective view of a battery module having battery cells and battery cell separators in accordance with the third embodiment of the present invention;

FIG. 11 illustrates an alternative set of mating ribs for battery cell separators shown in FIG. 6 to be stacked side-by-side in accordance with the third embodiment of the present invention;

FIG. 12 illustrates another alternative set of mating ribs for battery cell separators shown in FIG. 6 to be stacked side-by-side in accordance with the third embodiment of the present invention;

FIGS. 14A, 14B, and 14C respectively illustrate various views of a battery cell separator in accordance with a variation of the fourth embodiment of the present invention;

FIG. 15 illustrates a schematic view of a battery cell and a battery cell separator in accordance with a fifth embodiment of the present invention;

FIG. 16 illustrates a side view of a battery module having battery cells and battery cell separators in accordance with the fifth embodiment of the present invention;

FIG. 18A illustrates a sectional view of a battery cell separator and adjacent battery cells of a battery module in which the battery cell separator is in accordance with a first variation of a sixth embodiment of the present invention;

FIG. 18B illustrates a sectional view of a battery cell separator and adjacent battery cells of a battery module in which the battery cell separator is in accordance with a second variation of the sixth embodiment of the present invention;

FIG. 18C illustrates a sectional view of a battery cell separator and adjacent battery cells of a battery module in which the battery cell separator is in accordance with a third variation of the sixth embodiment of the present invention;

FIG. 19A illustrates a sectional view of a battery cell separator and adjacent battery cells of a battery module in which the battery cell separator is in accordance with a first variation of a seventh embodiment of the present invention;

FIG. 19B illustrates a sectional view of a battery cell separator and adjacent battery cells of a battery module in which the battery cell separator is in accordance with a second variation of the seventh embodiment of the present invention;

FIG. 20A illustrates a sectional view of a battery cell separator and adjacent battery cells of a battery module in which the battery cell separator is in accordance with a first variation of an eighth embodiment of the present invention;

FIG. 20B illustrates a sectional view of a battery cell separator and adjacent battery cells of a battery module in which the battery cell separator is in accordance with a second variation of the eighth embodiment of the present invention; and FIG. 20C illustrates a sectional view of a battery cell separator and adjacent battery cells of a battery module in which the battery cell separator is in accordance with a third variation of the eighth embodiment of the present invention.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
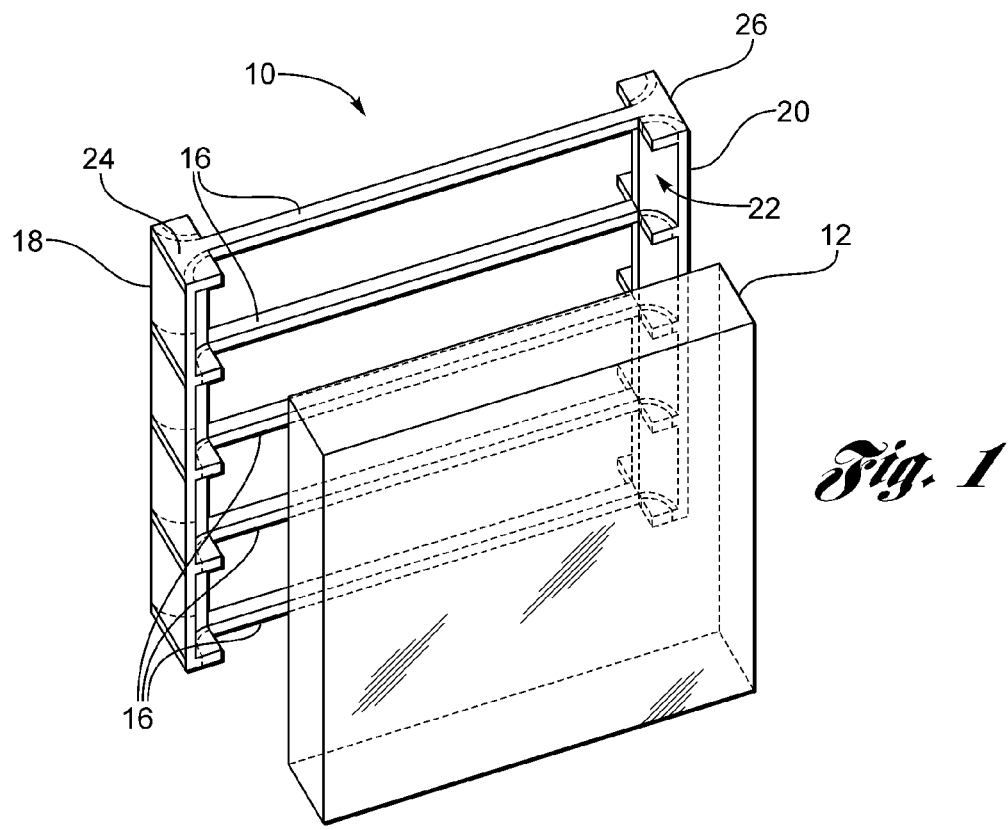
FIG. 1 illustrates a schematic view of a battery cell and a battery cell separator in accordance with a first embodiment of the present invention.
Figure 2:
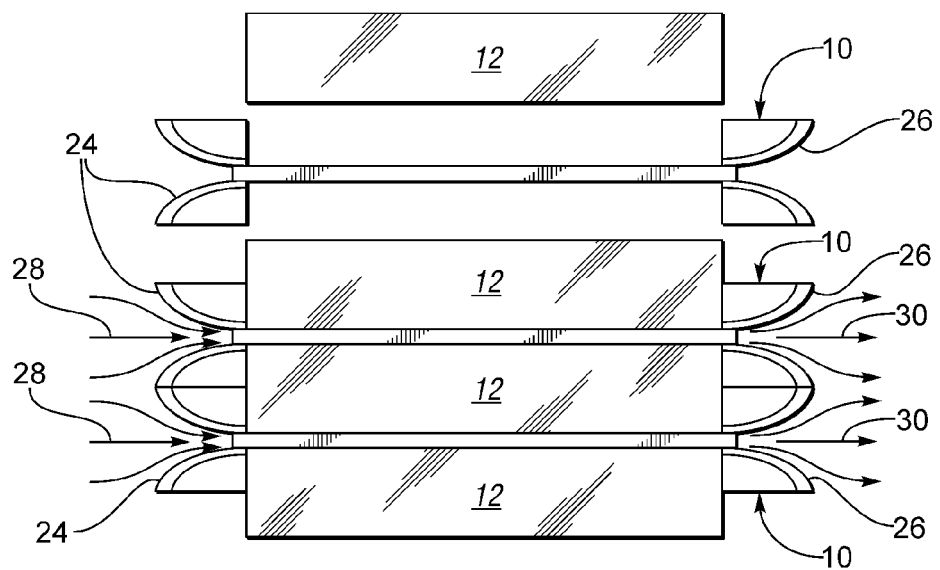
FIG. 2 illustrates a top down view of a battery module having battery cells and battery cell separators in accordance with the first embodiment of the present invention.

Referring now to FIGS. 1 and 2, a battery cell separator or spacer 10 in accordance with a first embodiment of the present invention will be described. FIG. 1 illustrates a schematic view of battery cell separator 10 and a battery cell 12. FIG. 2 illustrates a top down view of a battery module having battery cells 12 and battery cell separators 10.

Battery cell separator 10 pertains to a stackable alternating separator-cell-separator-cell, etc. design. The stacking separator design is stackable with separators 10 and battery cells 12 being placed side-by-side and stacked in alternating fashion (e.g., separator 10, cell 12, separator 10, cell 12, separator 10, etc.) as shown in FIG. 2.

Battery cell separator 10 includes a plurality of insulating ribs 16. In this example, separator 10 includes five ribs 16. Ribs 16 function to support a battery cell 12 and to separate cell 12 from adjacent cells 12 as can be seen in FIG. 2 (only one cell 12 is shown in FIG. 1). Separator 10 further includes two rib supports 18 and 20. First rib support 18 is on the left-end side of separator 10 and second rib support is on the right-end side of separator 10. Ribs 16 run between rib supports 18, 20. Ribs 16 and rib supports 18, 20 form a pair of pockets 22 on respective front and back sides of separator 10. Each pocket 22 is configured to receive a cell 12. Cells 12 sit within respective pockets 22. In particular, each pocket 22 has a prismatic shape (e.g., rectangular, box-shaped) as cell 12 has a prismatic shape.

In battery cell separator 10, rib supports 18, 20 connect ribs 16, prevent fore-aft movement of battery cell 12 when cell 12 is in pocket 22, provide a distributed load bearing surface to bear against adjacent rib supports in front of and behind the cells, and provide a converging fluid inlet 24 and diverging fluid outlet 26 for heating or cooling conditioning fluid flow. Separator 10 may include top and bottom flanges to prevent up-down cell movement. Inlet 24 and outlet 26 can be shaped parabolic to help reduce the pressure drop as cooling fluid proceeds from a larger cross-section inlet plenum in front, to smaller cross-section gaps between adjacent cells 12, and back to a larger cross-section exhaust plenum behind the cells.

As indicated above, FIG. 2 illustrates a top down view of a battery module having battery cell 12 and battery cell separators 10 which are stacked in an alternating fashion. As shown in FIG. 2, each set of fluid inlets 24 and fluid outlets 26 is formed by the union of two separators 10. Conditioning fluid 28 converges to enter between neighboring battery cells 12, flows between ribs 16 providing to, or removing heat from, the cells, and diverges as exhaust lines 30 to be discharged from the battery module.

Referring now to FIGS. 3 through 5B, a battery cell separator 32 in accordance with a second embodiment of the present invention will be described. Separator 32 pertains to a cartridge style separator design which together with a battery cell 44 forms a cartridge and cell sub-assembly. The cartridge and cell sub-assembly is to be stacked side-by-side with like cartridge and cell sub-assemblies.

Figure 3:
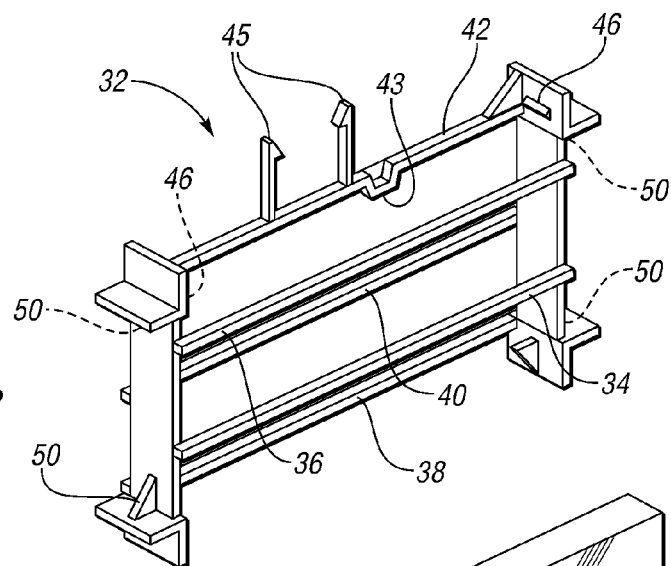
FIG. 3 illustrates a perspective view of a battery cell separator in accordance with a second embodiment of the present invention.
Figure 4A:
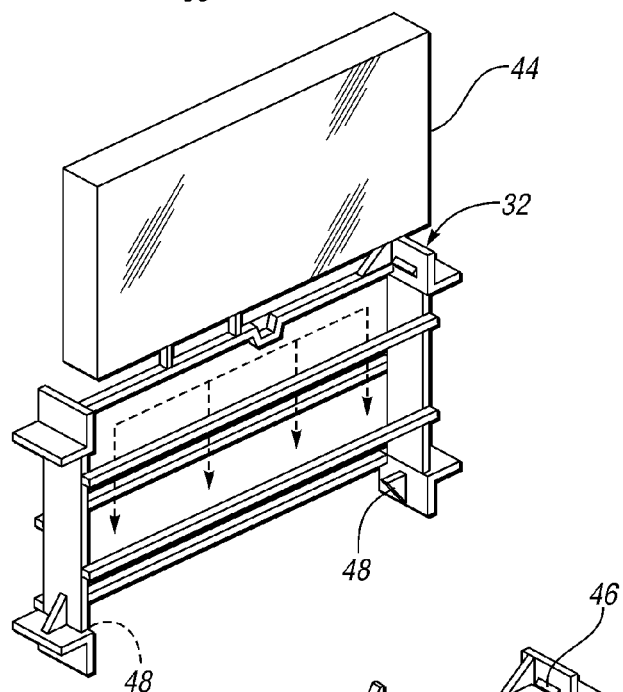
FIG. 4A illustrates a perspective view of a battery cell to be inserted into the battery cell separator shown in FIG. 3.
Figure 4B:
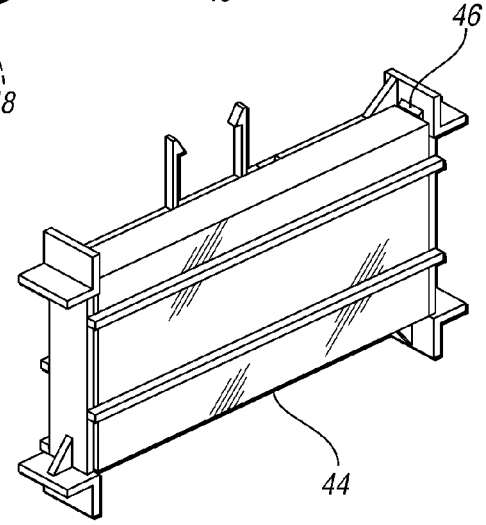
FIG. 4B illustrates a perspective view of the battery cell inserted into the battery cell separator shown in FIG. 3.

FIG. 3 illustrates a perspective view of battery cell separator 32. Separator 32 includes similar rib features as battery cell separator 10 shown in FIGS. 1 and 2. Separator 32 differs from separator 10 in that separator 32 is formed as a cartridge pocket configured to receive a battery cell 44 (shown in FIGS. 4A and 4B). As shown in FIG. 3, separator 32 includes a first set of ribs 34 and 36 and a second set of ribs 38, 40, and 42. The first set of ribs 34, 36 form one side of the cartridge pocket of separator 32 and the second set of ribs 38, 40, 42 form the other side of the cartridge pocket of separator 32. The cartridge pocket of separator 32 receives a battery cell 44 when loaded in a top down manner—see FIGS. 4A and 4B. In particular, the cartridge pocket of separator 32 has a prismatic shape (e.g., rectangular, box-shaped) as cell 44 has a prismatic shape.

Battery cell separator 32 further includes two relatively small, molded-in snap-over features 46. Snaps 46 are at the top inside of the cartridge pocket of separator 32 (one is hidden from view). When battery cell 44 is inserted into the cartridge pocket, there is a minor interference with snaps 46 until cell 44 is completely seated in the bottom of the cartridge pocket. At this point, snaps 46 snap over the top edges of cell 44 and thereby lock cell 44 into separator 32—see FIG. 4B. As such, snaps 46 prevent cell 44 from slipping out from the top of separator 32 during handling. Separator 32 further includes two depth stops 48 at the bottom of the cartridge pocket. Cell 44 seats against depth stops 48 at the end of the insertion—see FIG. 4A. Separator 32 further includes four triangular support walls 50. Support walls 50 strengthen the four corner channels.

Battery cell separator 32 may further include a sensor holder 43 on rib 42. Holder 43 is configured to receive and retain a temperature sensor for monitoring the temperature of a battery cell received by the cartridge pocket of separator 32. Separator 32 may further include a pair of retaining clips 45 on rib 42. Clips 45 are configured to retain a collection chamber for cell vent gases and/or to retain an electrical harness.

Figure 5A:
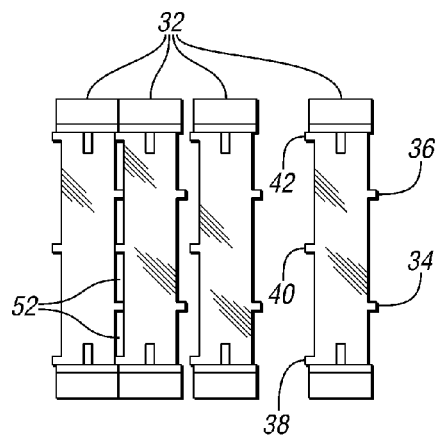
FIG. 5A illustrates a side view of a battery module having battery cells and battery cell separators in accordance with the second embodiment of the present invention.
Figure 5B:
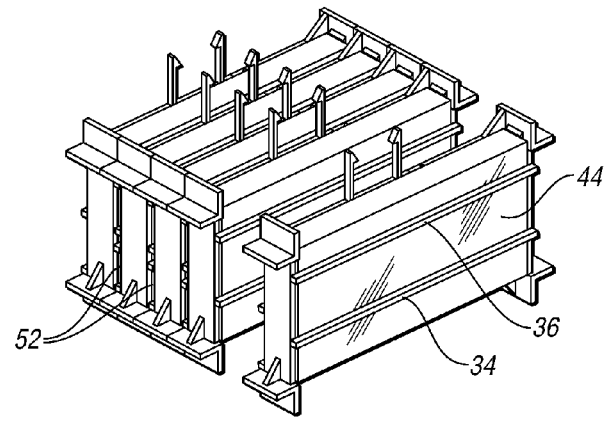
FIG. 5B illustrates a perspective view of the battery module shown in FIG. 5A.

FIGS. 5A and 5B illustrate views of a battery module having a plurality of battery cells 44 and battery cell separators 32. Each separator 32 has a cell 44 received in the cartridge pocket of the separator as shown in FIG. 5B. Each separator 32 with the inserted cell 44 therein forms a cartridge and cell sub-assembly. As such, the battery module includes a plurality of cartridge and cell sub-assemblies which are stacked side-by-side as shown in FIGS. 5A and 5B.

Separators 32 placed side-by-side together nestle into one another as shown best in FIG. 5A. This provides a total of five ribs between neighboring cells 44 (i.e., ribs 34, 36 of one separator 32 and ribs 38, 40, and 42 of the adjacent separator 32). Five ribs are provided between neighboring cells 44 even though there are only either two or three ribs per side for each individual cartridge and cell sub-assembly. In particular, for two separators 32 placed side-by-side, the side of one separator 32 having ribs 34, 36 meets the side of the other separator 32 having ribs 38, 40, 42. Ribs 34, 36 and ribs 38, 40, and 42 of adjacent side-by-side separators 32 form fluid channels 52 between these separators as shown in FIGS. 5A and 5B. As such, channels 52 run between cells 44 retained within separators 32.

Referring now to FIGS. 6 through 12, a battery cell separator 54 in accordance with a third embodiment of the present invention will be described. Separator 54 pertains to a cartridge style design that is an alternative to the cartridge style design of separator 32. As such, separator 54 is formed as a cartridge pocket configured to receive a battery cell inserted therein.

Figure 6:
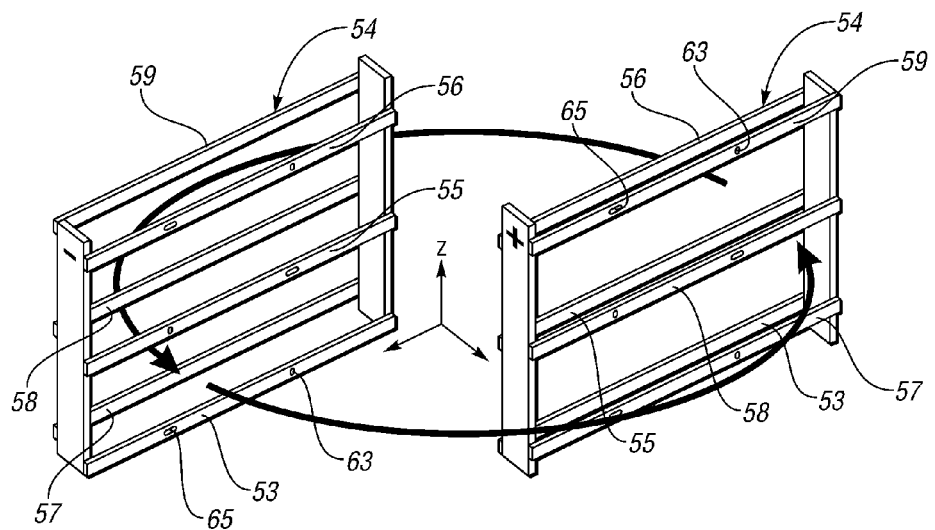
FIG. 6 illustrates perspective front and rear views of a battery cell separator in accordance with a third embodiment of the present invention.

FIG. 6 illustrates perspective front and rear views of a battery cell separator 54. Separator 54 is similar to separator 32 and includes many of the same features of separator 32. Separator 54 includes a first set of ribs 53, 55, and 56 and a second set of ribs 57, 58, and 59. The first set of ribs 53, 55, 56 form one side of the cartridge pocket of separator 54 and the second set of ribs 57, 58, 59 form the other side of the cartridge pocket of separator 54. Again, the cartridge pocket of separator 54 receives a battery cell with the cell being loaded in the cartridge pocket of separator 54 in a top down manner. Again, the cartridge pocket of separator 54 has a prismatic shape (e.g., rectangular, box-shaped) as the cell to loaded therein has a prismatic shape.

Separators 54 are stacked side-by-side with the ribs on one side of the cartridge pocket of one separator 54 butting up against the corresponding ribs on the same side of the cartridge pocket of a neighboring separator 54. For instance, ribs 53, 55, 56 on the first side of a first separator 54 respectively butt up against ribs 53, 55, 56 on the first side of a second separator 54 when these separators are stacked side-by-side with second separator 54 stacked next to the first side of first separator 54. Likewise, ribs 57, 58, 59 on the second side of first separator 54 respectively butt up against ribs 57, 58, 59 on the second side of a third separator 54 when these separators are stacked side-by-side with third separator 54 stacked next to the second side of first separator 54.

Because the ribs on either side of battery cell separator 54 butt up against neighboring separator ribs, the rib thickness is sized at half the desired conditioning fluid gap. FIGS. 7A and 7B respectively illustrate cross-sectional views of two mated ribs of two battery cell separators 54 placed side-by-side. As an example, the ribs shown in FIGS. 7A and 7B are ribs 55 of first and second separators 54. Mated ribs 55 collectively form a desired coolant gap. In this example, the desired gap ($D_1$) is approximately 3 mm. To achieve this, each rib 55 is approximately 1.5 mm across ($D_2$). The pair of ribs 55 shown in FIG. 7A is approximately 2 mm high ($D_3$). When placed together and loaded in the direction of the arrow, the 2×3 mm rib pair may tend to shift if not perfectly balanced, with one rib slipping up and the other slipping down to relieve some of the compression pressure. To avoid producing this lateral column type failure, ribs 55 can be made taller as shown in the pair of ribs 55 shown in FIG. 7B, which are approximately 5 mm high ($D_4$).

To further reduce the likelihood of the ribs slipping relative to each other and to facilitate separator to separator rib alignment, an alignment feature having a locator pin 63 and a corresponding hole (slot) 65 can be integrated into each rib. This feature can be seen in ribs 55 in FIG. 7B in which pin 63 of one rib 55 inserts into hole 65 of the other rib 55 when these ribs 55 are mated. This feature can be seen farther back in an isometric view in FIGS. 6A and 6B. With reference to FIGS. 6A and 6B, there could be multiple pin and hole arrangements and the holes could be slots to ease the locating constraints. The pin and hole features can help both assembly locating and creep slippage as the battery cell heats and loads the separators.

Given the increased height of ribs 55 shown in FIG. 7B, fewer ribs may be used for the same cell array compression loading. For this reason, battery cell separator 54 is shown as only having three ribs (load transfer areas) per cell side, rather than five ribs per cell side as with separators 10 and 32.

FIG. 8 illustrates a perspective view of a battery module having battery cells 44 and battery cell separators 54. Each separator 54 has a cell 44 received in the cartridge pocket of the separator as shown in FIG. 8. Each separator 54 with the inserted cell 44 therein forms a cartridge and cell sub-assembly. As such, the battery module includes a plurality of cartridge and cell sub-assemblies which are stacked side-by-side like the battery module shown in FIG. 5B.

As shown in FIG. 8, as well as in FIG. 6, the end walls of neighboring separators 54 are not the same height. Rather, the end walls 60 on the separator side having the positive pole are taller than end walls 62 on separator side having the negative pole. Correspondingly, the battery cell itself may be configured with a tab 64 that extends off of the negative end. Tab 64 is designed to collide with the raised end wall 60 of separator 54 to prevent full insertion of the cell into the separator if the negative pole of the cell is erroneously inserted on the positive end of the separator. As such, raised end wall 60 of separator 54 is provided for "Poka-Yoke" error proofing with tab 64 of the battery cell. Tab 64 of the battery cell may be formed in the plastic shroud that isolates and supports the negative terminal.

Figure 9A:
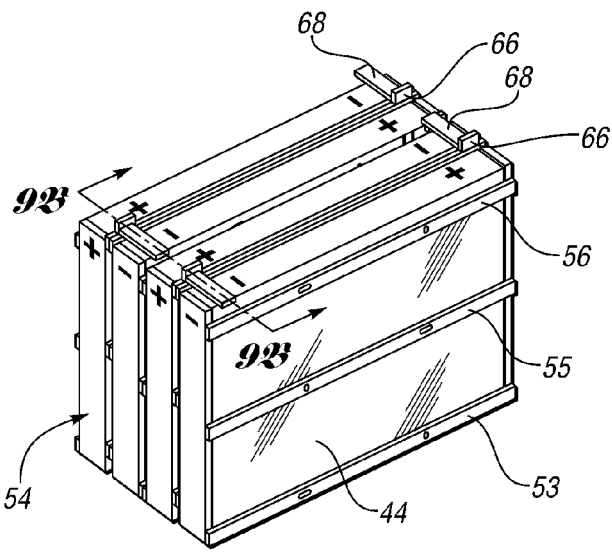
FIG. 9A illustrates a perspective view of a battery module having battery cells and battery cell separators in accordance with a variation of the third embodiment of the present invention.
Figure 9B:
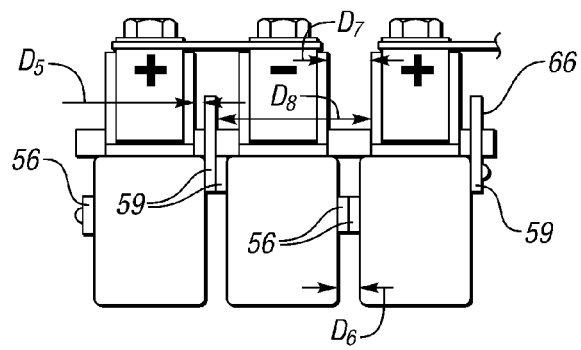
FIG. 9B illustrates a sectional view of the battery module shown in FIG. 9A.

FIGS. 9A and 9B respectively illustrate perspective and sectional views of a battery module having battery cells 44 and battery cell separators 54 in accordance with a variation of the third embodiment of the present invention. Again, the battery module includes a plurality of cartridge and cell sub-assemblies which are stacked side-by-side.

The battery module as shown in FIG. 9A is a variation of the battery module as shown in FIG. 8 in that the separator wall 66 and cell tab features 68 are on the side (long edge) of the sub-assembly, rather than at the end as shown in FIG. 8. This removes obstructions from the two top corners that may be used for the cell array retention in a battery assembly. Moving these features to the side also allows the negative terminal tab to extend to the neighboring cell positive terminal. When the tab is designed to butt up against the neighboring cell terminal, it can act as an anti-rotation feature to resist twisting of the terminal during build-up of a battery array. Because the cell polarities are flipped when assembled into an array, the tab off the negative terminal flips as well. The net effect is that half of the cell terminals will load a neighboring cell terminal during fastener secure. The negative terminal of the cell can have a tab extending in both directions to achieve good support for all of the cell terminals during fastener securing. This solution also serves as a type of fail-safe feature for proper separator to separator placement during the cell build up, since two negative terminals placed adjacent to each other would have colliding tabs.

FIG. 9B is a cross-sectional view of a portion of the array shown in FIG. 9A and illustrates some dimensions for the array. A single rib may have a thickness $D_5$ of approximately 1.5 mm, so two ribs abutting each other will provide an approximately 3 mm ($D_6$) flow path for cooling fluid. In this configuration, $D_7$ may be approximately 6 mm and $D_8$ approximately 18.5 mm.

Figure 10A:
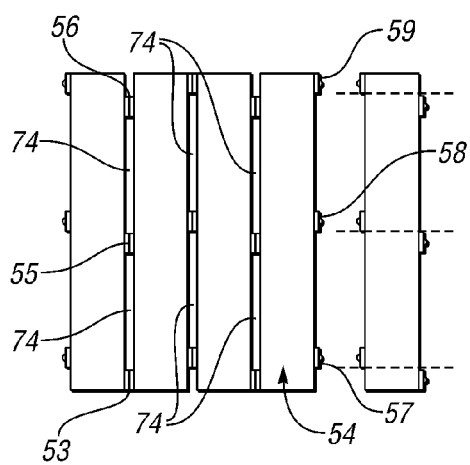
FIG. 10A illustrates a side view of a plurality of battery cell separators shown in FIG. 6 stacked side-by-side in accordance with the third embodiment of the present invention.

FIG. 10A illustrates a side view of a plurality of battery cell separators 54 stacked side-by-side. As shown in FIG. 10A, first set of ribs 53, 55, and 56 and second set of ribs 57, 58, and 59 for the two sides of each separator 54 are staggered in the Z direction. This is why the same separator 54 did not look the same in FIGS. 6A and 6B when viewed from the two different sides.

Figure 10B:
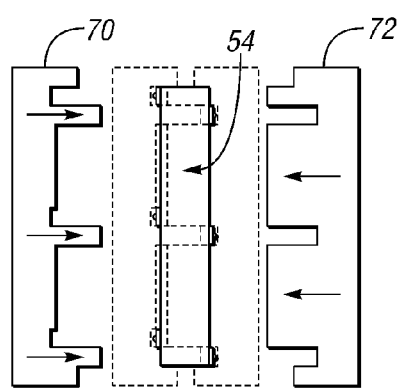
FIG. 10B illustrates a directional tool for making a battery cell separator shown in FIG. 6.

One reason the ribs are staggered is to allow a single direction molding tool to manufacture battery cell separator 54. That is, the ribs are staggered in the Z-direction to facilitate a simplified tool design. FIG. 10B illustrates a directional tool having molds 70, 72 for making separator 54. FIG. 10B illustrates an example of how molds 70, 72 might engage to achieve tool simplicity and cost reduction. The dotted outlines illustrate when the tool is nearly closed. It is also apparent from FIG. 10A that the developed cooling fluid channels 74 are slightly staggered with respect to each other. This is expected to have a negligible effect on the cooling performance.

FIGS. 11 and 12 respectively illustrate alternative sets of mating ribs for battery cell separators 54. In FIG. 11, ribs 76 of the same side of neighboring battery cell separators 54 are configured with an overkill rib alignment. In FIG. 12, ribs 78 of the same side of neighboring battery cell separators 54 are configured with a thin rib alignment. Both configurations facilitate separator-to-separator alignment and aligned ribs under a compressive load. Both configurations can support rotation about the Z axis such that the two identical parts can locate and mate to each other.

As described, a battery cell separator 54 in accordance with the third embodiment of the present invention may provide one or more of the following advantages: error proofing of a battery cell into the separator and the separator to neighboring separators; manufactured using a simple, single direction tool; a design that mates to itself such that there is only one separator design required, rather than two options; a design that holds a battery cell with a single piece and is not subject to unsnapping or falling apart; a design having ribs configured to distribute compressive loading and resist slipping or sagging; and a design having a feature to resist rotational moments induced on the cell terminals during battery module assembly.

As also described, a battery module having a plurality of battery cell separators in accordance with the first embodiment of the present invention as illustrated in FIGS. 1 and 2 includes the converging and diverging features to reduce pressure drop of a fluid through the array of battery cells. As also described, a battery cell separator in accordance with the second embodiment of the present invention as illustrated in FIGS. 3 through 5B includes features on each corner to engage a retention rail or other support structure.

Figure 13B:
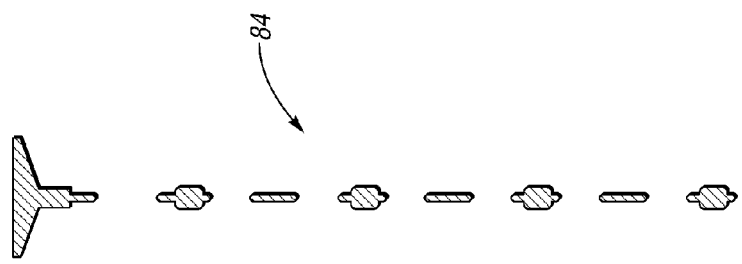
FIG. 13B illustrates a cross-sectional view of the battery cell separator shown in FIG. 13A.
Figure 13A:
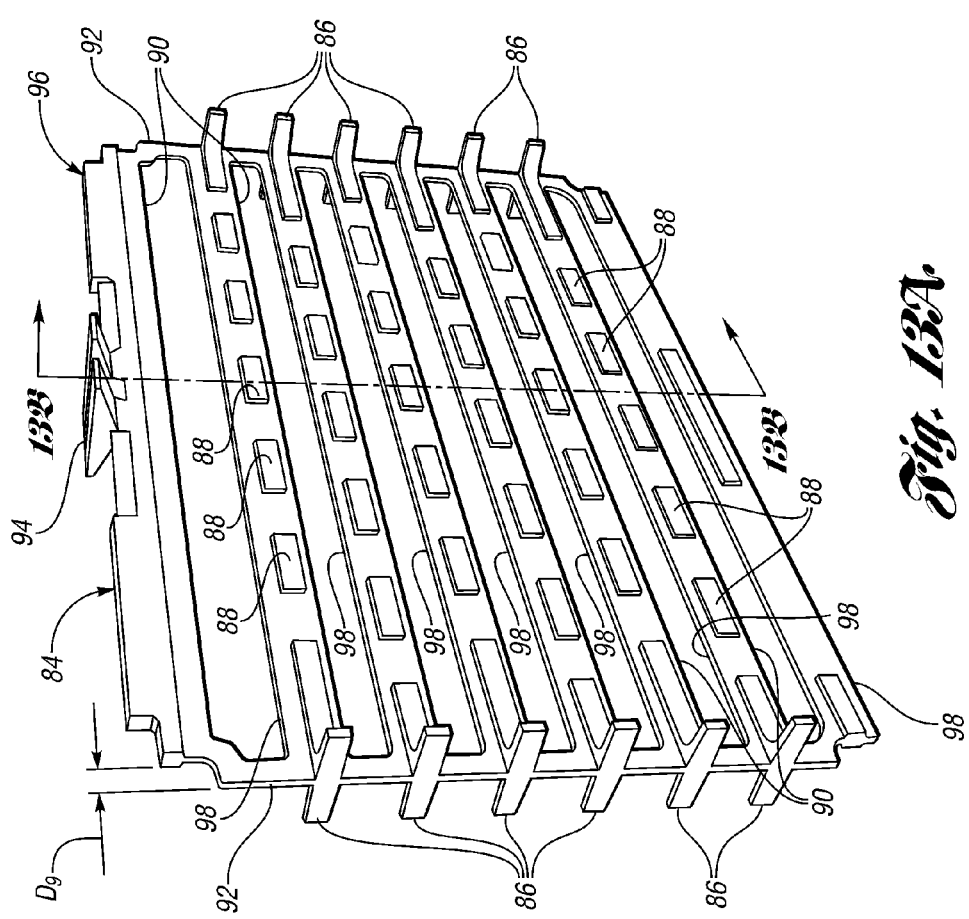
FIG. 13A illustrates a battery cell separator in accordance with a fourth embodiment of the present invention.

Referring now to FIGS. 13A and 13B, a battery cell separator 84 in accordance with a fourth embodiment of the present invention will be described. Separator 84 is not a cartridge style structure. Rather, akin to battery cell separator 10 shown in FIG. 1, separator 84 cradles a battery cell. Separator 84 includes flanges 86 which inhibit end movement of the battery cell.

In a battery module, separators may be used between adjacent battery cells for one or more of the following reasons: 1) a separation gap between cells prevents cell cases from touching, which prevents current leakage and cell damage; 2) a separation gap between cells enables fluid cooling of the cells; and 3) separators can be used to isolate the battery terminals. In addition, prismatic (e.g., rectangular, box-shaped, etc.) cells may require the cell sides to be contained with a certain amount of pressure, or binding, to prevent the internal spring forces of the cell windings from expanding and damaging themselves and consequently reducing cell life. Battery cell separators in accordance with the present invention, such as battery cell separator 84, create sufficient binding on the cell sides without covering so much of the cell surface area that cooling becomes ineffective.

Battery cell separator 84 may include: 1) a separator thickness that creates a cell spacing of approximately 2.5 mm; 2) ribs 88 running lengthwise, which are discontinuous to increase exposed surface area for cooling (see cross-sectional view in FIG. 13B); 3) ribs 88, at least some of which are geometrically positioned on cell winding areas to maximize binding effectiveness; 4) openings 90 (windows) between ribs which reduce fluid flow restriction; 5) sides 92 which extend by a distance ($D_9$) beyond where a battery cell ends to discourage incidental tool contact, which reduces risk of cell damage; 6) flanges 94, 86 which respectively extend on top and sides of separator 84 to prevent exposure; 7) a top slat rib 96 acts as positive cell retention to ensure cell spacing during operation; 8) top slat rib 96 extends above cell top to contact a cell terminal (stud) assembly to improve joint torque capability, to create barrier against conductive tracking (electrical creepage) between cell tops, and/or to prevent thermal cooling fluid and gas exchange across the top of separator 84; 9) plus-shaped patterns formed by ribs and walls between cell sides which creates a barrier against conductive tracking between cell sides; and 10) seven, evenly-spaced supports 98 having dashed ribs 88 with dashes spaced to optimize binding pressure while reducing the surface area coverage.

FIGS. 14A, 14B, and 14C respectively illustrate various views of a battery cell separator 100 in accordance with a variation of the fourth embodiment of the present invention. Separator 100 is similar to battery cell structure 84 shown in FIGS. 13A and 13B. Separator 100 includes continuous ribs 102, 104, 106. Separator 100 further includes discontinuous ribs 108, 110, 112, 114, 116, 118. Each rib may have a height (as viewed in FIG. 14A) of approximately 3 mm. Separator 100 may have an overall height of approximately 130 mm, which extends beyond a 120 mm height battery cell by 5 mm on each end. Top rib 102 also extends beyond the top of a battery cell used with separator 100. Ribs 108, 112 have a width of approximately 20 mm, while ribs 114, 118 are approximately half as wide. Rib 110 is approximately 40 mm wide and rib 116 is approximately 30 mm wide. At the top of separator 100, tabs 120, 122 extend upward; they can mate with a bus bar and resist torque loads. FIG. 14B is a bottom view of separator 100. The ends 124, 126 are tapered at approximately 45 degrees to form a point, but this is only on ribs 104, 106, 108, 110, 112—see FIG. 14C.

Referring now to FIGS. 15 and 16, a battery cell separator 128 in accordance with a fifth embodiment of the present invention will be described. FIG. 15 illustrates a schematic view of a battery cell 129 and a separator 128. FIG. 16 illustrates a side view of a battery module having cells 129 and separators 128.

Separator 128 includes insulator/separator ribs 130, 132, 134 held together by a carrier 136. Carrier such as carrier 136 may be on one side only as shown or may be on front and back sides, or anywhere that allows cooling fluid flow to be maintained. An optional concave rib 138 may be used to capture any released electrolyte and keep it from between cells. Rib 138 may be configured with a draft angle 140 to facilitate manufacturing. The entire separator 128 may be made as a one-piece molded apparatus.

FIG. 16 illustrates a battery module formed form a plurality of battery cells 129 and a plurality of battery cell separators 128. Separators 128 separate cells 129 as shown in FIG. 16.

As shown by the grouped arrows in FIGS. 15 and 16, fluid flows between battery cells 129 benefitting from entrance effects 142 and exit effects 144. Entrance effects 142 and exit effects 144, as described above, may be generally parabolic or of another shape to facilitate the flow.

As described, a battery cell separator to be used with a battery module having battery cells connected in an array in accordance with embodiments of the present invention may include one or more retaining and separating features for the cells. Ribs can be used to support the cells and provide separation between adjacent cells. The separation of the ribs can be configured such that flow paths are created between the cells for a heating or cooling fluid ("fluid" being air or liquid). The separators can also include one or more geometric features to help ensure proper alignment during assembly and eliminate assembly errors.

Additional configurations of battery modules formed by battery cells and battery cell separators in accordance with embodiments of the present invention may include separators formed of insulators and conductors arranged in various ways. Various types of folded or stamped materials can be used for battery cell separators in addition to molded ones such as described herein.

Figure 17A:
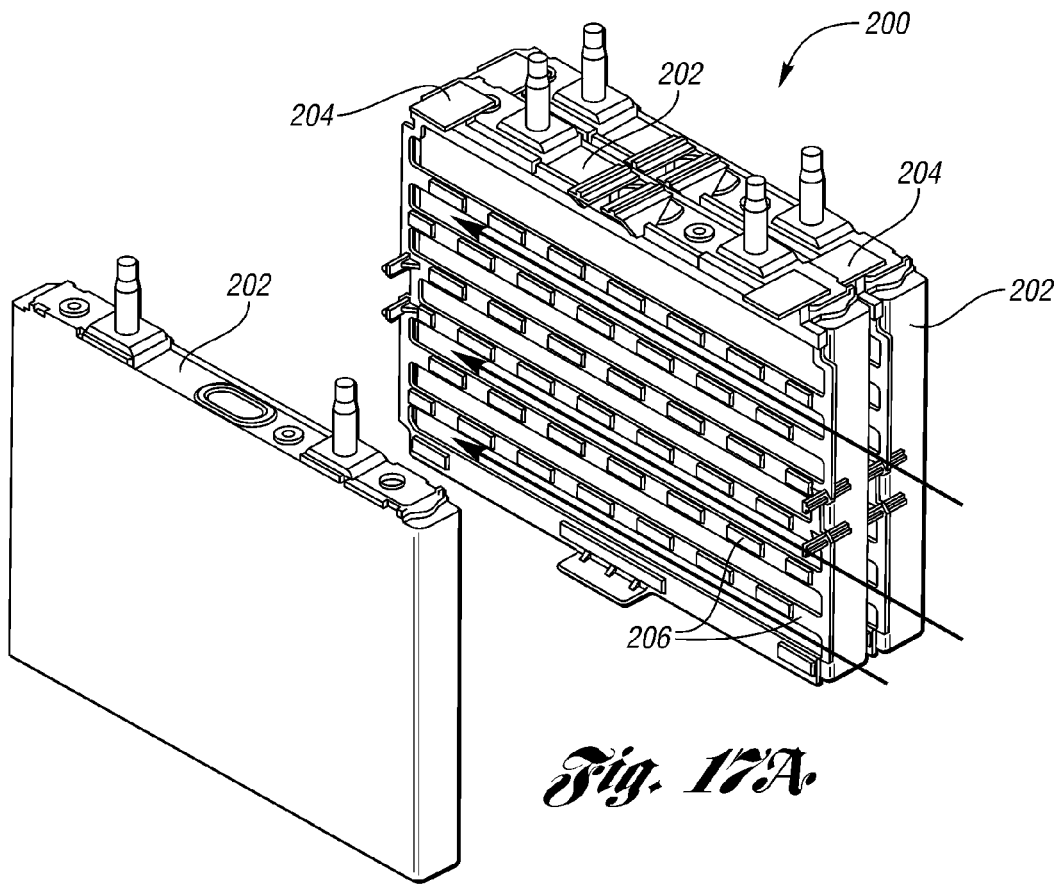
FIG. 17A illustrates a perspective view of a representative alternating separator-cell design battery module having battery cells and battery cell separators in accordance with embodiments of the present invention.

Referring now to FIG. 17A, a perspective view of a representative battery module 200 having battery cells 202 and battery cell separators 204 in accordance with embodiments of the present invention is shown. Battery module 200 pertains to a stackable alternating separator-cell-separator-cell, etc. design. The stacking separator design is stackable with battery cells 202 and separators 204 being placed side-by-side and stacked in alternating fashion (e.g., cell 202, separator 204, cell 202, separator 204, cell 202, etc.) as shown in FIG. 17A.

Cells 202 have the same prismatic shape. Separators 204 have the same design. Each separator 204 includes a plurality of ribs 206. Ribs 206 of a separator 204 run longitudinally between the laterally extending rib supports (not numbered) at the ends of the separator. Ribs 206 of a separator 204 form a type of divider (i.e., "separator") on each of the front and back sides of the separator. Cells 202 are respectively positioned against ribs 206 of a separator 204 on respective front and back sides of the separator. As such, in battery module 200, a pair of cells 202 sandwich a separator 204 and the separator 204 and another separator 204 sandwich one of these cells 202 as shown in FIG. 17A.

Figure 17B:
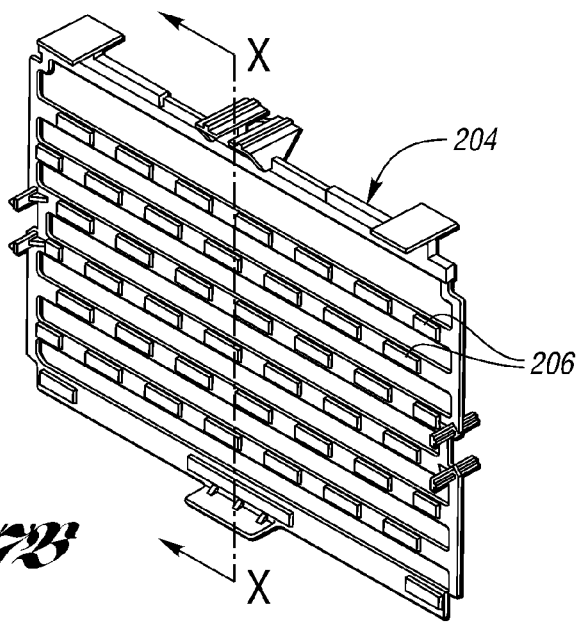
FIG. 17B illustrates an isometric view of a battery cell separator of the representative battery module.

Referring now to FIG. 17B, an isometric view of a battery cell separator 204 of battery module 200 is shown. FIG. 17B includes sectional line X-X. As described below, sectional line X-X is a point of reference for the sectional views of FIGS. 18, 19, and 20.

Referring now to FIGS. 18A, 18B, and 18C, with continual reference to FIGS. 17A and 17B, respective sectional views of a battery cell separator and adjacent battery cells 202 of a battery module in which the battery cell separator is in accordance with respective variations of a sixth embodiment of the present invention are shown. A battery cell separator in accordance with the sixth embodiment of the present invention generally has a "saw wave" separator design.

In FIG. 18A, a battery module 210 includes a battery cell separator 214 in accordance with a first variation of the sixth embodiment of the present invention. Separator 214 is a single separator piece 216 composed only of an insulator (e.g., a plastic mold). Separator piece 216 has a simple saw tooth wave design as viewed in cross-section in correspondence with the line X-X of FIG. 17B. Separator piece 216 includes a dish section 218 at its top end to trap moisture and conduct away from battery cells 202.

In FIG. 18B, a battery module 220 includes a battery cell separator 224 in accordance with a second variation of the sixth embodiment of the present invention. Separator 224 is a single separator piece 226 composed only of an insulator (e.g., another plastic mold). Similar to separator piece 216 of FIG. 18A, separator piece 226 has a saw tooth wave device as viewed in cross-section in correspondence with the line X-X of FIG. 17B. However, unlike separator piece 216, separator piece 226 has additional horizontally oriented columns 228. Columns 228 are to enable separator 224 to withstand relatively greater compressive loads between battery cells 202 (traditionally compressed towards one another in an array design).

In FIG. 18C, a battery module 230 includes a battery cell separator 234 in accordance with a third variation of the sixth embodiment of the present invention. Separator 234 is formed of two components: a separator piece 236 composed of an insulator and an array of conductive horizontally oriented columns 238. Conductive columns 238 assist in heat transfer surface area (i.e., conducting heat from battery cell wall into the fin for relatively more surface area exposure to the cooling medium). Separator 234 generally has the same configuration as separator 224 of FIG. 18B with the difference being that columns 238 of separator 234 are conductive whereas columns 228 of separator 224 are insulators as columns 228 are part of insulator separator piece 226 of separator 224.

Referring now to FIGS. 19A and 19B, with continual reference to FIGS. 17A and 17B, respective sectional views of a battery cell separator and adjacent battery cells 202 of a battery module in which the battery cell separator is in accordance with respective variations of a seventh embodiment of the present invention are shown. A battery cell separator in accordance with the seventh embodiment of the present invention generally has a "square wave" separator design.

In FIG. 19A, a battery module 240 includes a battery cell separator 244 in accordance with a first variation of a seventh embodiment of the present invention. Separator 244 is formed of two components: a crenelated conductor 246 and an array of individual insulators 248. Conductor 246 is crenelated as viewed in cross-section in correspondence with the line X-X of FIG. 17B. Insulators 248 are added to one side of respective portions of crenelated conductor 246 in order to electrically isolate the two cans of battery cells 202.

In FIG. 19B, a battery module 250 includes a battery cell separator 254 in accordance with a second variation of the seventh embodiment of the present invention. Separator 254 is formed of three components: first and second crenelated conductors 256a and 256b and an insulator sheet layer 258. Insulator sheet layer 258 separates first and second crenelated conductors 256a and 256b in order to isolate them electrically from one another. This variation provides a relatively more balanced cooling arrangement for multiple battery cells 202.

Referring now to FIGS. 20A, 20B, and 20C, with continual reference to FIGS. 17A and 17B, respective sectional views of a battery cell separator and adjacent battery cells 202 of a battery module in which the battery cell separator is in accordance with respective variations of an eighth embodiment of the present invention are shown. A battery cell separator in accordance with the eighth embodiment of the present invention generally has a "sine wave" separator design.

In FIG. 20A, a battery module 260 includes a battery cell separator 264 in accordance with a first variation of an eighth embodiment of the present invention. Separator 264 is a corrugated separator formed of a wave-shaped conductor 266 and an insulator sheet layer 268. Conductor 266 is wave-shaped as viewed in cross-section in correspondence with the line X-X of FIG. 17B. Insulator sheet layer 268 is added to one side of conductor 266 between a battery cell 202 and the side of conductor 266.

In FIG. 20B, a battery module 270 includes a battery cell separator 274 in accordance with a second variation of the eighth embodiment of the present invention. Separator 274 is a corrugated separator formed of a wave-shaped conductor 276 and an array of discrete insulator portions 278. Insulator portions 278 are added to respective crest portions on one side of conductor 276 between a battery cell 202 and the side of conductor 276. For example, insulator portions 278 are attached via push pins into the respective crest portions of conductor 276 or molded or dipped on the surface of the respective crest portions of conductor 276.

In FIG. 20C, a battery module 280 includes a battery cell separator 284 in accordance with a third variation of the eighth embodiment of the present invention. Separator 284 is a corrugated separator formed of a wave-shaped conductor 286 and a corresponding wave-shaped insulator layer 288. Insulator layer 288 is added to one side of conductor 286 between a battery cell 202 and the side of conductor 286.

With reference to FIGS. 18, 19, and 20, among all of the design variations, an intent is to facilitate battery cells with no insulating shrink wrap or other barrier applied to the cells to save the expense associated with such wrap. Thus, the cell spacing, creation of cooling air channels, and cell-to-cell isolation is achieved all in a single, insulating piece.

All of the designs including all of the cross-sectional profiles described herein can be accomplished using only an insulating layer to enable a simpler, lower cost, lower part count solution. The designs of FIGS. 18C, 19A, 19B, 20A, 20B, and 20C are examples of how to integrate (heat) conductors into the battery cell separators when additional heat transfer is required. In each of these designs, it is still desirable to maintain electrical isolation between two adjacent battery cells to avoid the necessity of a shrink wrap insulating layer. Some designs emphasize fewer parts per separator, while others spacer, while others emphasize less volume/mass per spacer.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A battery module comprising:
a battery cell separator including a body having front and rear sides for being stacked against respective battery cells, the body having a cross-section between the front and rear sides with one of a saw-wave pattern, a square-wave pattern, and a sine-wave pattern, the separator further including columns extending between the front and rear sides of the body.

2. The module of claim 1 wherein:
the separator is a single piece of an electrical insulator.

3. The module of claim 1 wherein:
the separator is a single piece of plastic.

4. The module of claim 1 wherein:
the body further includes a dish section to trap moisture.

5. The module of claim 1 wherein:
the body is a single piece of an electrical insulator.

6. The module of claim 5 wherein:
the columns are thermal conductors.

7. The module of claim 1 further comprising:
a second battery cell separator including a body having front and rear sides for being stacked against respective battery cells, the body of the second separator having a cross-section between the front and rear sides with one of a saw-wave pattern, a square-wave pattern, and a sine-wave pattern; and
a battery cell stacked against the front side of the body of one of the separators and stacked against the rear side of the other one of the separators.

8. A battery module comprising:
a battery cell separator including first and second thermally conductive bodies and an electrical insulator, each body having a front side for being stacked against a respective battery cell, each body further having a rear side, each body having a cross-section between the front and rear sides of the body with a crenelated pattern, the insulator being between the rear sides of the bodies.

* * * * *